US011644532B2

(12) United States Patent
Porez et al.

(10) Patent No.: US 11,644,532 B2
(45) Date of Patent: May 9, 2023

(54) METHOD AND DEVICE FOR RADAR TRANSMISSION AND RECEPTION BY DYNAMIC CHANGE OF POLARIZATION NOTABLY FOR THE IMPLEMENTATION OF INTERLEAVED RADAR MODES

(71) Applicant: THALES, Courbevoie (FR)

(72) Inventors: Nicolas Porez, Merignac (FR); Pascal Cornic, Brest (FR); Patrick Garrec, Merignac (FR)

(73) Assignee: THALES, Courbevoie (FR)

( * ) Notice: Subject to any disclaimer, the term of this patent is extended or adjusted under 35 U.S.C. 154(b) by 342 days.

(21) Appl. No.: 16/836,048

(22) Filed: Mar. 31, 2020

(65) Prior Publication Data

US 2020/0319292 A1     Oct. 8, 2020

(30) Foreign Application Priority Data

Apr. 4, 2019    (FR) ...................................... 1903614

(51) Int. Cl.
*G01S 7/02*          (2006.01)
*G01S 7/282*        (2006.01)
(Continued)

(52) U.S. Cl.
CPC ............. *G01S 7/025* (2013.01); *G01S 7/282* (2013.01); *G01S 13/30* (2013.01); *G01S 13/89* (2013.01);
(Continued)

(58) Field of Classification Search
CPC .......... G01S 7/025; G01S 7/282; G01S 13/30; G01S 13/89; G01S 13/20; G01S 13/22;
(Continued)

(56) References Cited

U.S. PATENT DOCUMENTS 4,231,037 A * 10/1980 Long ...................... G01S 7/292
                                                342/149
5,206,655 A *  4/1993 Caille ...................... H01Q 3/26
                                                342/25 R
(Continued)

FOREIGN PATENT DOCUMENTS

FR        3 039 726 A1     2/2017
JP         11-142504 A     5/1999
(Continued)

OTHER PUBLICATIONS

Wang, et al., "Analysis of concatenated waveforms and required STC", 2008 IEEE Radar Conference, May 26, 2008.

*Primary Examiner* — Vladimir Magloire
*Assistant Examiner* — Yonghong Li
(74) *Attorney, Agent, or Firm* — BakerHostetler

(57) ABSTRACT

Method and device for radar transmission and reception by dynamic change of polarization notably for the implementation of interleaved radar modes are provided. A radar transmission-reception method and a device for implementing this method, the method alternatively implementing two modes of operation, a short range mode exploiting short pulses and a long range mode exploiting modulated long pulses, the method consisting, for each mode, in: producing two synchronous radiofrequency (RF) transmission signals having between them a phase-shift $\theta$ of controllable given value; radiating two radiofrequency waves, each corresponding to one of the transmission RF signals produced, by means of two colocated radiating sources each having a given polarization axis; handling the reception of the backscattered radiofrequency signals picked up by each of the radiating sources, and delivering two radiofrequency (RF) reception signals each corresponding to a radiofrequency signal picked up by one of the radiating sources, a phase- (Continued)

shift θ' being applied between the two signals delivered, θ' being able to be determined as being equal to θ.

16 Claims, 6 Drawing Sheets

(51) Int. Cl.
  *G01S 13/30* (2006.01)
  *G01S 13/89* (2006.01)
  *H01Q 9/04* (2006.01)
  *H01Q 21/06* (2006.01)

(52) U.S. Cl.
  CPC ......... *H01Q 9/0407* (2013.01); *H01Q 21/065* (2013.01)

(58) Field of Classification Search
  CPC .. G01S 13/9052; G01S 13/9076; G01S 7/024; G01S 7/032; G01S 7/02; G01S 7/03; G01S 13/90; G01S 13/933; G01S 13/10; H01Q 9/0407; H01Q 21/065; H01Q 25/001; H01Q 9/045; H01Q 15/24
  See application file for complete search history.

(56) References Cited

U.S. PATENT DOCUMENTS

| | | | |
|---|---|---|---|
| 6,266,010 B1 * | 7/2001 | Ammar | H01Q 3/38 342/374 |
| 10,371,796 B2 * | 8/2019 | Kishigami | G01S 13/325 |
| 2018/0335518 A1 * | 11/2018 | Fox | G01S 7/025 |

FOREIGN PATENT DOCUMENTS

| | | | |
|---|---|---|---|
| JP | 11142504 A | * | 5/1999 |
| JP | 2011247776 A | * | 12/2011 |
| WO | 2017/021307 A1 | | 2/2017 |

* cited by examiner

[Fig. 1]
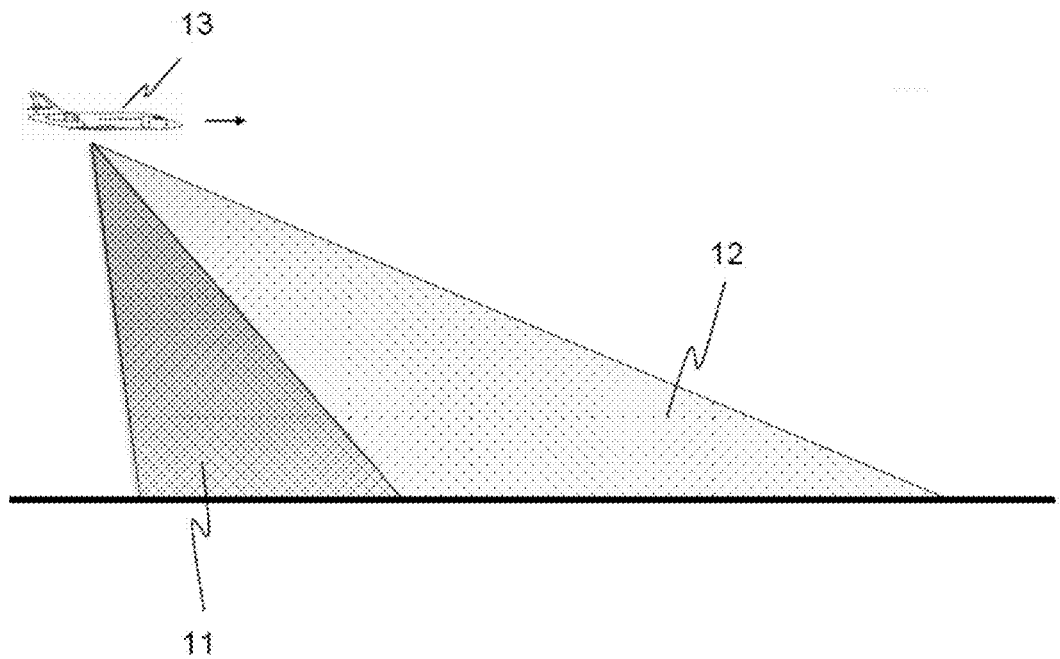
[Fig. 2]
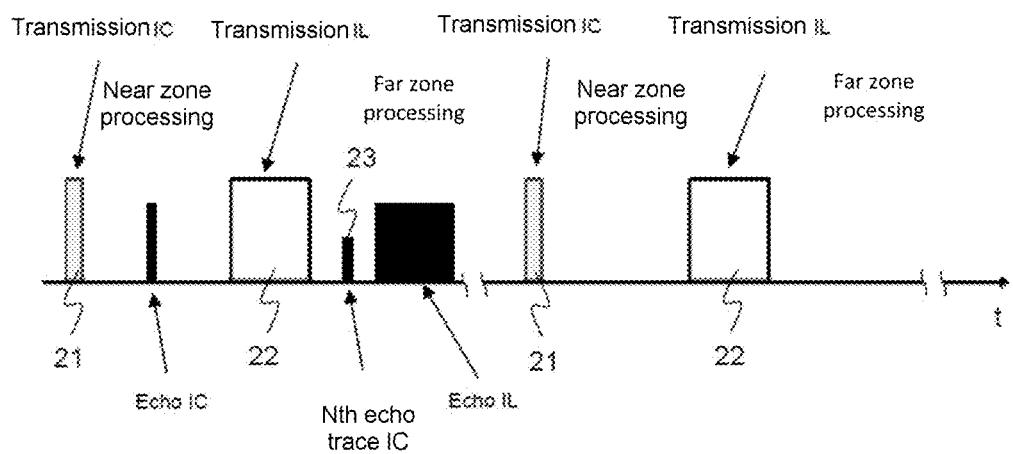

[Fig. 3]
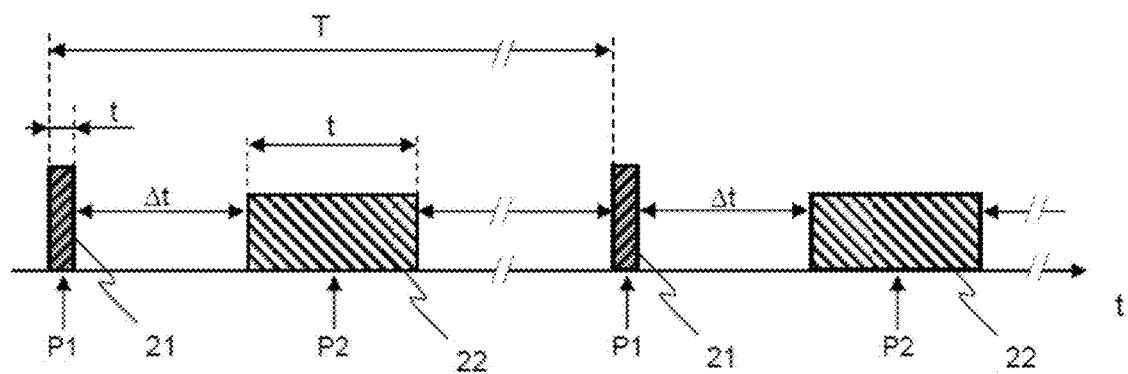
[Fig. 4]
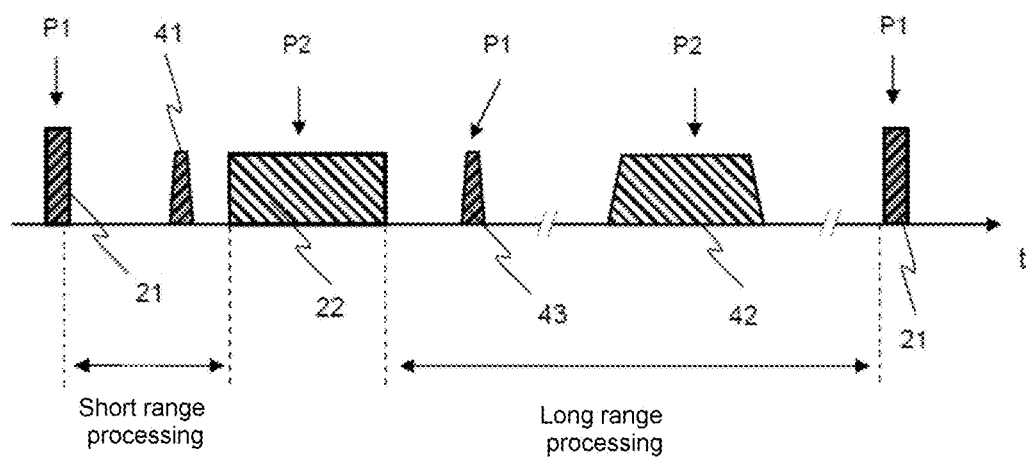

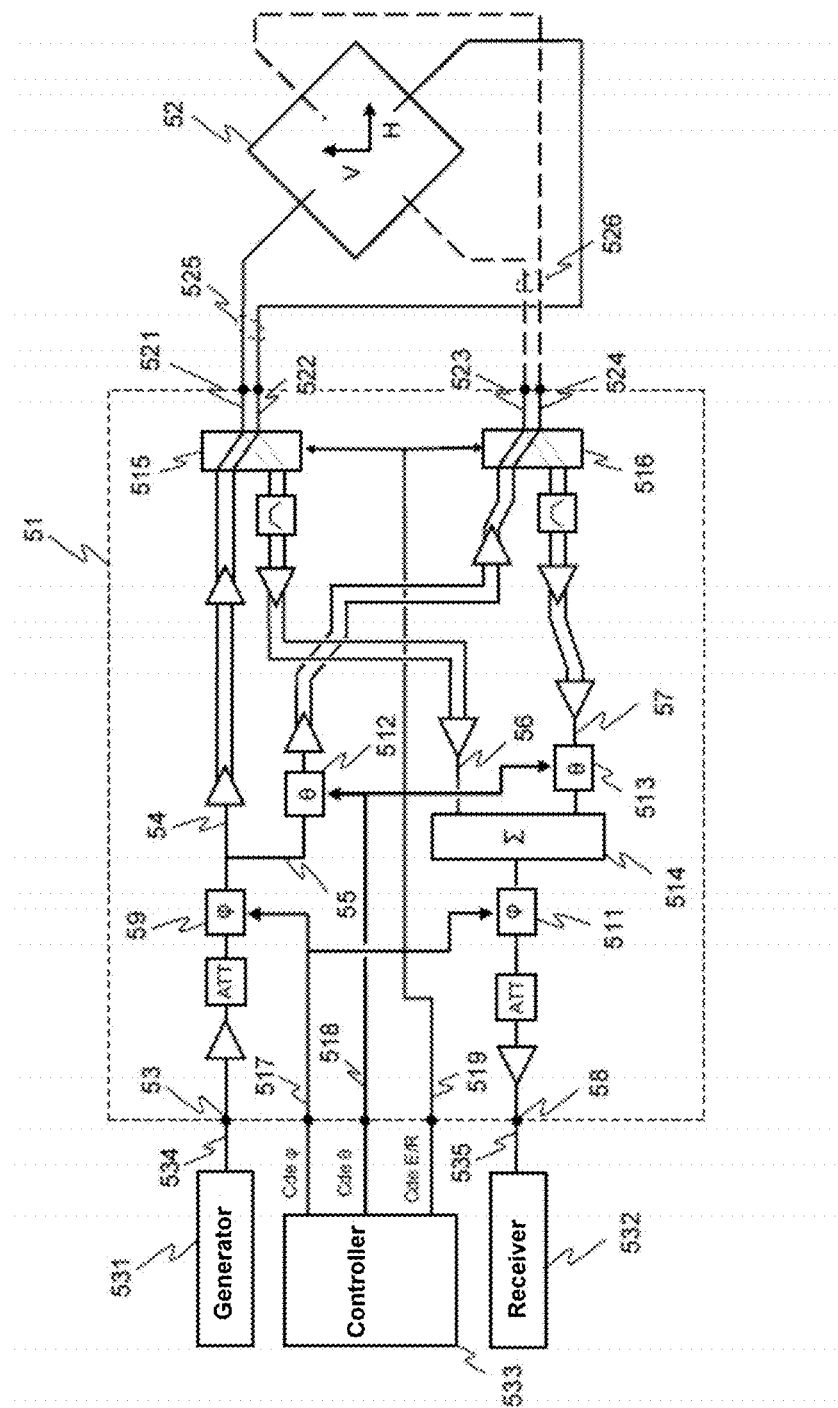
[Fig. 5]

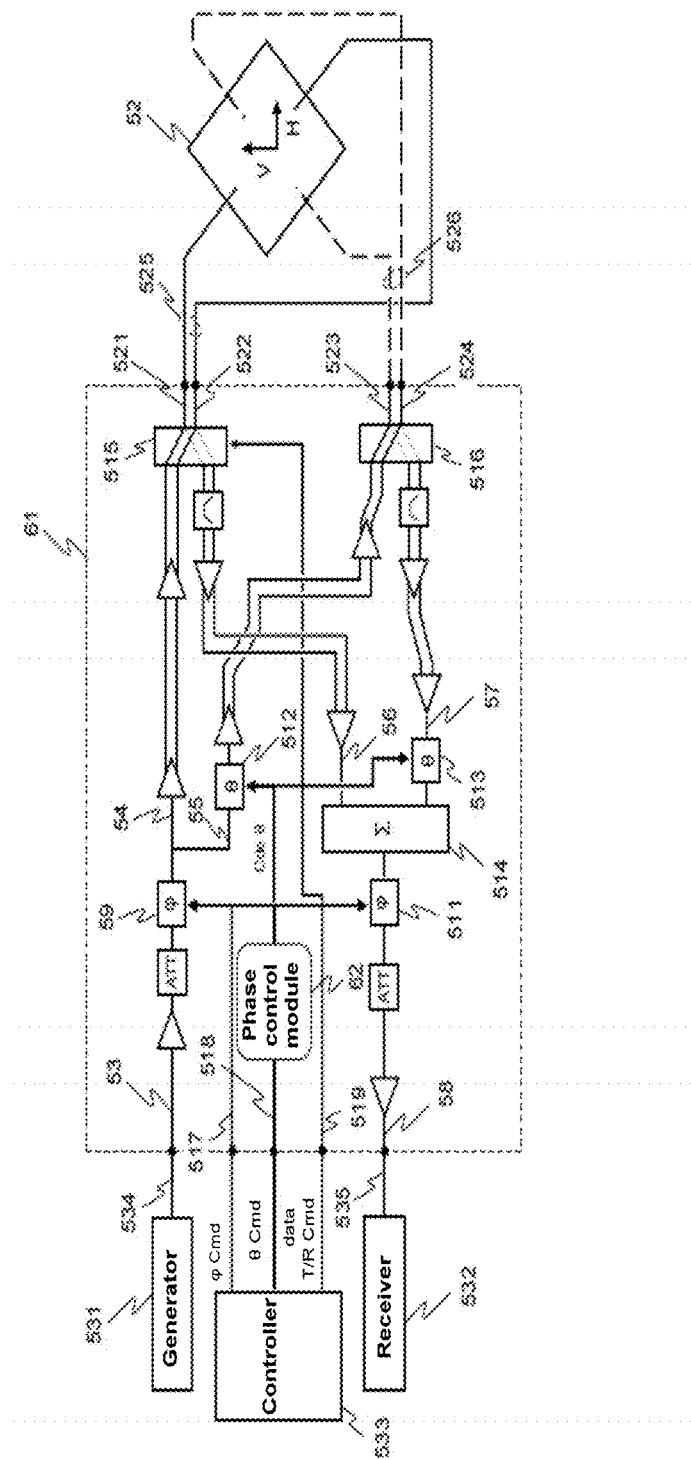
[Fig. 6]

[Fig. 7]
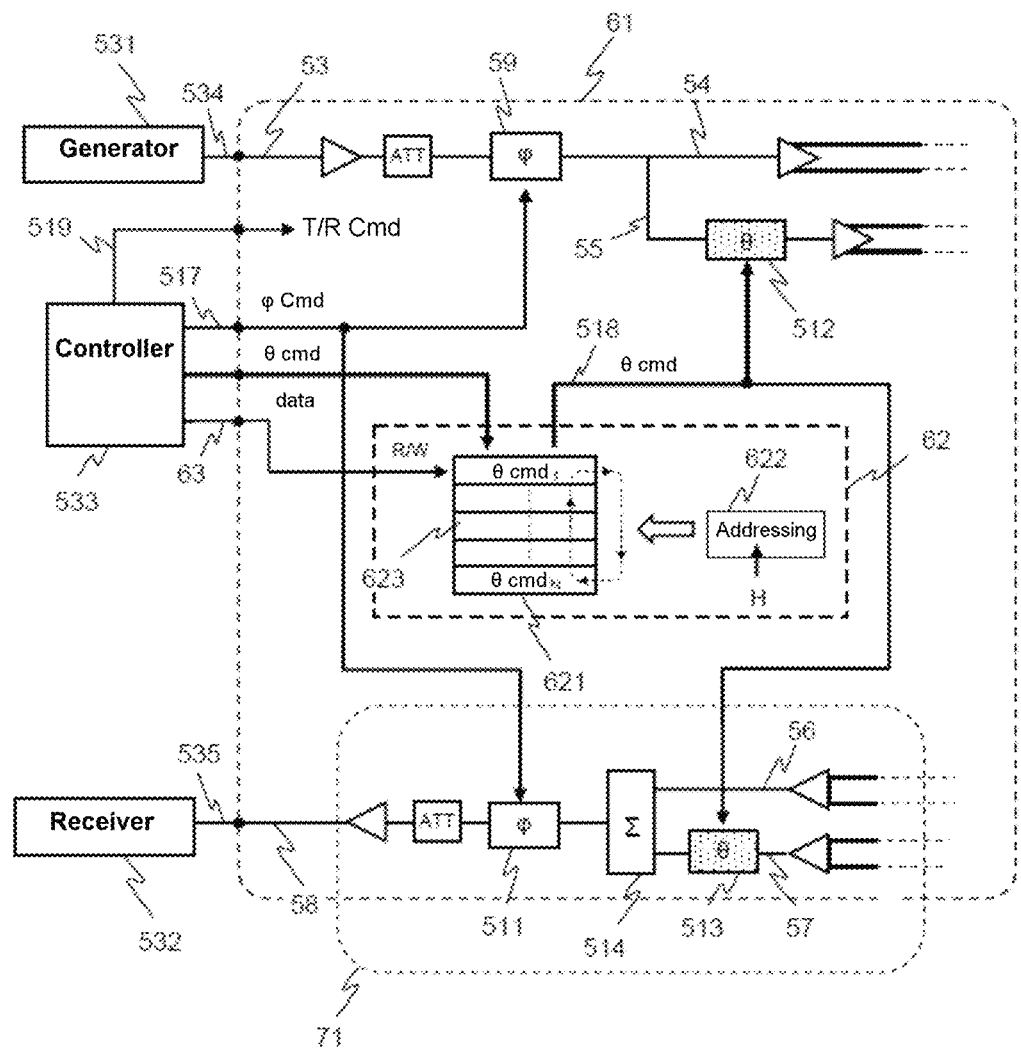

[Fig. 8]
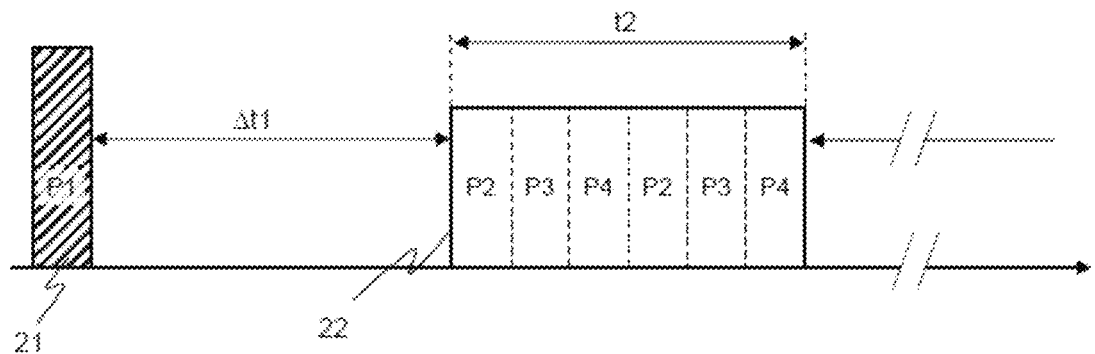
[Fig.9]
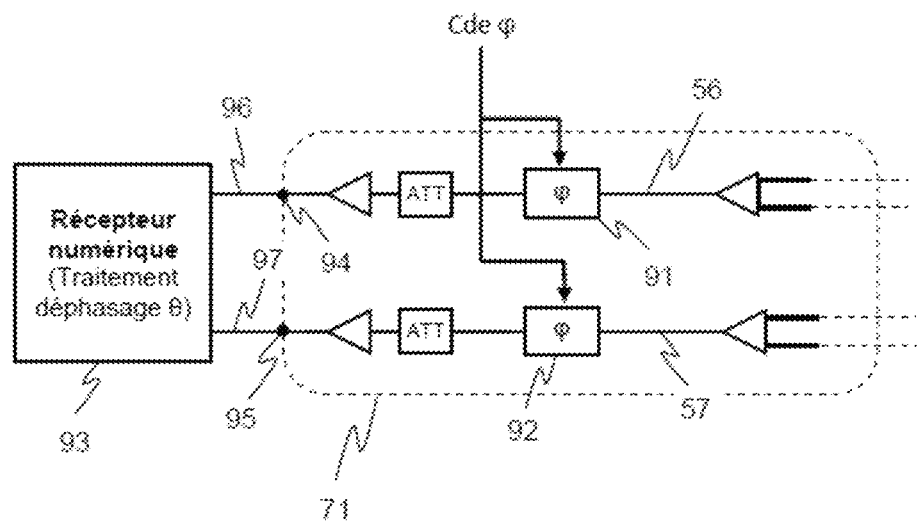
Digital receiver (Phase-shift θ processing)

METHOD AND DEVICE FOR RADAR TRANSMISSION AND RECEPTION BY DYNAMIC CHANGE OF POLARIZATION NOTABLY FOR THE IMPLEMENTATION OF INTERLEAVED RADAR MODES

CROSS-REFERENCE TO RELATED APPLICATIONS

This application claims priority to foreign French patent application No. FR 1903614, filed on Apr. 4, 2019, the disclosure of which is incorporated by reference in its entirety.

FIELD OF THE INVENTION

The invention relates to the general field of radiofrequency detection and location systems.

It relates in particular to the field of the use of radar equipment, notably long pulse radars with pulse compression and to the implementation, on such radars, of modes of operation with temporally interleaved transmissions.

BACKGROUND

Conventionally, the transmissions from airborne maritime patrol and surveillance radars have horizontal polarization (HH). The function of the maritime surveillance radars is notably to explore the regions of the space extending under the carrier over a given distance, as illustrated by FIG. 1.

To do this, they use, as is known, wave forms of bi-pulse type, transmitted by means of active electronic scanning antennas which allow pointing in two different directions with a quasi-instantaneous switching time. Such a hardware configuration notably makes it possible to cover a vast distance range by exploiting the electron beam elevation agility.

In the context of the transmission of wave forms of bi-pulse type, illustrated by FIG. 2, a first beam 11 in which there is transmitted a so-called short pulse (IC), of pulse length LI1, with a recurrence period TR1, illuminates a close distance zone, whereas a second beam 12, in which there is transmitted a so-called long pulse (IL), of pulse length LI2, with a recurrence period TR2, illuminates a farther distance zone, contiguous to the close distance zone. Together, the two transmissions 21 and 22, temporally interleaved, make it possible, as is known, to cover a continuous distance range without blind zones.

The terms long pulse and short pulse reflect the respective durations of the pulses that make up each transmitted pattern. It is notably essential for the duration of the repetition period (PRI) of the short pulse to be greater than the duration of the long pulse, to be able to instrument the blind zone which corresponds to the transmission time of the long pulse.

Such a mode of operation does however present, as is known also, the drawback of resulting, during the period of listening, of reception, which follows the transmission of a long pulse 22, in the appearance of echoes 23 resulting from the reflection, by objects situated in the far zone, of the short pulse 21 having preceded the pulse concerned (echoes IC of nth traces).

These echoes, called "nth traces" mix with the echoes from the long pulse 22 and affect the operation thereof by causing the appearance of interference signals in the zone concerned. These interferences, inherent to the bi-pulse operation as currently designed, consequently have to be detected in order to be eliminated. This role is generally allocated, after reception, to the signal processing means which implement various known algorithms which try more or less successfully to proceed to eliminate the echoes of nth traces. To this end, wobulation methods are for example employed.

To limit the drawbacks of the implementation of an interleaved mode of operation, it is also known practice to associate a different coverage with each of the operating phases, near zone operating phase using the short pulses (IC) or far zone operating phases using the long pulses (IL).

Thus, for the transmission of a short pulse and the reception of the corresponding echoes (near zone operation), the antenna of the radar (of the radiofrequency detection system) concerned is generally pointed according to a determined elevation, to limit the reception of the ground reverberation echoes which have a strong near zone amplitude.

On the other hand, for the transmission of a long pulse and the reception of the corresponding echoes (far zone operation), the antenna of the radar (of the radiofrequency detection system) concerned is generally pointed according to a low elevation, close the horizontal, allowing the transmitted radiofrequency wave to reach more distant zones.

Consequently, for the far zone mode of operation, the ground reverberation echoes can advantageously be disregarded because they mostly occur upon the transmission of the long pulse itself, at a moment when the receiver is inactive.

On the other hand, because of the switch to a low coverage, the reverberation echoes of the short pulse by the ground that occur during the implementation of the far zone mode of operation, are also received by the receiver.

These echoes are likely to disrupt, in particular, the operation of compression of the long pulses on reception, such that a portion of the compression gain may be lost.

Thus, by implementing the known techniques, the current systems cannot be totally free of the undesirable effects of the use of temporal interleaving, as described previously, an interleaving that is necessary to ensure dual coverage, both near zone and far zone coverage.

SUMMARY OF THE INVENTION

One aim of the invention is to propose a solution that allows a detection system to adopt a dual mode of operation allowing it to cover the near and far zones of its environment by transmitting a wave form comprising a short pulse followed by a long pulse, without this mode of operation affecting the detection performances expected for the coverage of the far zones.

To this end, the subject of the invention is a radar transmission and reception method implementing a short range mode of operation with transmission of a short pulse and a long range mode of operation with transmission of a modulated long pulse, the short and long pulses transmitted being temporally interleaved, said method being characterized in that the short pulses and the long pulses are transmitted as wave forms having distinct polarizations.

According to various implementations, the method according to the invention can have various features, each being able to be considered alone or in combination with other features.

Thus, according to one feature of the invention, the polarization of each transmitted wave is obtained by simultaneously transmitting, by two colocated radiating sources, for each pulse, two signals having a phase-shift θ whose value varies according to the short or long nature of the pulse concerned.

According to another feature, in the case of a short pulse, the two signals transmitted have a phase-shift θ whose value induces a vertical polarization of the transmitted wave and in that, for the long pulse, the two signals transmitted have a phase-shift whose value induces a horizontal polarization of the transmitted wave.

According to another feature, backscattered radiofrequency signals, following the transmission of a pulse, being picked up by each of the radiating sources, a phase-shift θ' of given value is applied to the radiofrequency signal received by that same source.

According to another feature, the phase-shift θ' is equal to the phase-shift θ.

Another subject of the invention is a radar transmission-reception device capable of implementing such a method, said device being configured to perform the following operations:
  producing two synchronous radiofrequency (RF) transmission signals, said signals having between them a phase-shift θ of controllable given value, said signals having the amplitudes are also controllable;
  radiating two radiofrequency waves, each corresponding to one of the transmission RF signals produced, by means of two radiating sources (two radiating elements), these sources each having a given polarization axis;
  handling the reception of the backscattered radiofrequency signals picked up by each of the radiating sources, and
  delivering two radiofrequency (RF) reception signals, each signal corresponding to the backscattered radiofrequency signal picked up by one of the radiating sources, to which a given phase-shift θ' is applied.

According to various provisions, each being able to be considered alone or in combination, the device according to the invention can have different features.

Thus, according to a first feature, the device comprises a radiating element and an electronic circuit incorporating a first transmission/reception module, consisting of a first transmission path and a first reception path and a second transmission/reception module, consisting of a second transmission path and a second reception path, the two transmission/reception modules having identical structures; each transmission/reception module comprising a switch making it possible to alternately connect the transmission path and the reception path of the module concerned to the radiating element.

According to another feature, the radiating element is formed by a patch antenna, substantially planar, having a regular form, comprising four connection points disposed pairwise symmetrically relative to the centre of the patch, along two right-angled axes, two symmetrical connection points forming a connection port of the antenna.

According to one embodiment, this radiating element is a patch antenna of square form.

According to another feature, the first and second transmission/reception modules are each connected to the radiating element by a pair of power supply lines, the connection points disposed symmetrically on the antenna patch are linked to the inputs/outputs of a same transmission/reception module via a switch.

According to another feature, the inputs of the first and second transmission paths of the two transmission/reception modules are configured to be driven by a same RF signal delivered by a wave form generator linked to the electronic circuit by an input, the transmission path of the second transmission/reception module comprising at the input a controllable phase-shifter circuit making it possible to introduce a given phase-shift θ between the two transmission paths.

According to one embodiment, the electronic circuit comprises a control module configured to independently generate the commands for the phase-shifters responsible for the phase-shift θ, said module mainly comprising a memory and an address generator configured to apply a circular addressing of locations of the memory.

According to a first embodiment, the outputs of the first and second reception paths of the transmission/reception modules are summed by means of an adder circuit then linked to a same receiver by a common output of the electronic circuit, the reception path of the second transmission/reception module comprising at its output a controllable phase-shifter circuit making it possible to introduce, between the two reception paths, the given phase-shift θ equal to the phase-shift introduced between the two transmission paths.

According to a feature, the electronic circuit comprises controllable phase-shifters configured to apply a same phase-shift φ to the RF signal delivered by the wave form generator and to the signals delivered by the two reception paths.

According to another embodiment, the outputs of the first and second reception paths of the transmission/reception modules are linked, by two outputs of the electronic circuit, to two distinct reception paths of a same digital receiver configured to apply a phase-shift θ' between the signals from the two reception paths.

According to a feature, each of the reception paths comprises a controllable phase-shifter, each of the phase-shifters being configured to apply to the corresponding reception path a same phase-shift φ equal to the phase-shift applied to the RF signal delivered by the wave form generator.

Yet another subject of the invention is a radar surveillance system comprising a wave form generator, an array of path antennas and a receiver, said system comprising a set of transmission-reception devices according to the invention, the wave form generator and the receiver being linked to each of the patch antennas of the array via a transmission-reception device.

The features and advantages of the invention will be better appreciated from the following description, a description which is based on the attached figures.

BRIEF DESCRIPTION OF THE DRAWINGS

The attached figures illustrate the invention:
FIG. 1 and FIG. 2, mentioned in the preamble of this description, present schematic illustrations highlighting the technical problem to which the invention provides a solution.

FIG. 3 and FIG. 4 present illustrations, in timing diagram form, of the general principle of operation of the invention.

FIG. 5 presents a block diagram of the structure of a transmission/reception device allowing for the implementation of the method according to the invention, the device as disclosed in the patent application FR 15 01644, filed previously by the applicant.

FIG. 6 presents a block diagram of the structure of the transmission/reception device according to the invention.

FIG. 7 presents a partial block diagram of the structure of the transmission/reception device of FIG. 6 detailing the structure of the phase control module and its positioning in the transmission and reception paths of the device.

FIG. 8 presents a partial block diagram of the structure of the transmission/reception device of FIG. 6 illustrating an alternative embodiment of the reception paths.

FIG. 9 presents an illustration in timing diagram form, of an implementation of the device according to the invention suited to the detection of the presence of electric cables.

DETAILED DESCRIPTION

It should be noted that, in the attached figures, a same functional or structural element preferably bears a same reference symbol.

As stated previously, one of the objects of the invention is to address, in the context notably of radar detection systems operating in bi-pulse mode to eliminate the blind zones, the problems resulting from the presence of nth trace echoes originating from a short pulse that are received during the phase of reception of the echoes originating from the long pulse which follows said short pulse.

To do this, the method according to the invention consists, as illustrated by FIGS. 3 and 4, in differentiating the polarization of the electromagnetic wave transmitted depending on whether the transmitted pulse is a short pulse 21 or a long pulse 22. This modification of the polarization is done by transmitting, simultaneously for each pulse, by two colocated radiating sources, two signals having a phase-shift whose value varies according to whether the pulse concerned is a short pulse or a long pulse. By recombination in air of the radiated waves corresponding to the two transmitted signals, the method according to the invention makes it possible to generate a resultant wave polarized according to a given polarization which depends on the relative phase of the signals radiated by the two sources.

Preferentially, in short range operation, a vertical polarization P1 is used, so as to minimize the effect of the multiple reflections, by virtue of the Brewster incidence, and, in long range operation, a horizontal polarization P2 is used so as to create interference fringes specifically to advantageously increase the radar range.

The implementation of the method according to the invention is done by using a device configured to perform the following operations:

producing two synchronous radiofrequency (RF) transmission signals, having between them a phase-shift of given value, the value of the phase-shift being controllable. It is, in this way, possible to program a set of polarizations with a pitch interval dependant on the digital phase-shift control, a discretisation by 3-degree pitch intervals for example.

producing two transmission signals whose amplitudes are also controllable;

radiating two radiofrequency waves each corresponding to one of the transmission RF signals, by means of two radiating sources (i.e. two radiating elements) each having a given polarization axis;

handling the reception of the backscattered radiofrequency signals picked up by each of the radiating sources and delivering two radiofrequency (RF) reception signals each corresponding to a radiofrequency signal; a relative phase-shift equal to the phase-shift introduced in transmission being applied to the reception RF signals.

According to the invention, this device is configured to receive an RF signal corresponding to the wave form to be transmitted, this signal being, for example, synthesized by the wave form generator of the radar, and to deliver, to the two radiating sources, two RF transmission signals produced from the RF signal received, said RF transmission signals being phase-shifted relative to one another by a given phase-shift.

This device is also configured to transmit to the receiver of the radar the RF reception signals corresponding to the radiofrequency signals picked up.

FIG. 5 illustrates the theoretical structure of an embodiment of a transmission/reception device capable of implementing the method according to the invention. This theoretical structure, described elsewhere in detail in the French patent application FR 15 01644 filed on Jul. 31, 2015 by the applicant, is quoted here so as to make it possible to clearly present the specific elements introduced into this structure in the context of the present invention.

This theoretical structure, illustrated by FIG. 5, comprises a radiating element 52 and an electronic circuit 51, incorporating a first transmission/reception module, consisting of a transmission path 54 and a reception path 56 and a second transmission/reception module consisting of a transmission path 55 and a reception path 57. The two transmission/reception modules have identical structures.

Each transmission/reception module comprises a switch, 515 or 516 respectively, making it possible to alternately connect the transmission path and the reception path of the module concerned to the radiating element 52.

Moreover, the inputs of the transmission paths 54 and 55 of the two transmission/reception modules are configured to be driven by a same RF signal 534 delivered by the wave form generator of the radar 531 linked to the electronic circuit 51 by an input 53. However, the transmission path 55 of the second transmission/reception module comprises, at the input, a controllable phase-shifter 512, making it possible to introduce a given phase-shift θ between the two transmission paths.

Analogously, the two reception paths 56 and 57 are summed by means of a summer circuit 514 to form a common reception path 58 linked to the radar receiver 532 delivering to the radar receiver 532 an RF reception signal 535 corresponding to the sum of the radiofrequency signals delivered by the radiating element 52. The reception path 57 of the second transmission/reception module however comprises, at its output, before summing, a controllable phase-shifter circuit 513 making it possible to introduce, between the two reception paths, a given phase-shift θ equal to the phase-shift introduced between the two transmission paths.

The function of the first and second transmission/reception modules is mainly to transform the signal transmitted by the wave form generator of the radar into radiofrequency signals, or RF transmission signals, intended to be transmitted in differential form to the radiating element 52, respectively via the inputs/outputs 521-522 of the electronic circuit for the first module and the inputs/outputs 523-524 for the second module.

The radiating element 52, represented schematically in FIG. 5, consists of a substantially planar "patch" antenna, having a regular form, a square form for example, and comprising four connection points (ports) disposed pairwise symmetrically relative to the centre of the patch, on two right-angled axes, each group of two symmetrical connection points forming a connection port of the antenna. As the abovementioned patent application details, such an antenna makes it possible to radiate an excitation RF signal along two distinct right-angled polarization axes.

As FIG. 5 illustrates, the first and second transmission/reception modules are each connected to the radiating element 52 by a pair of power supply lines, 525 and 526 respectively. The symmetrically disposed ports are linked to the inputs/outputs of a same transmission/reception module via a switch 515 or 516.

The electronic circuit 51 also comprises control inputs allowing a control module 533, the computer responsible for managing the transmission and reception within the radar device for example, to drive it by applying the appropriate commands to these inputs. The electronic circuit 51 thus comprises:
- an input 517 dedicated to the control of a controllable phase-shifter circuit 59, configured to apply a phase-shift $\varphi$ to the signal delivered by the wave form generator 531 before its application to the transmission paths 54 and 55 of the two transmission/reception modules, and to the control of a controllable phase-shifter circuit 511, configured to apply this same phase-shift $\varphi$ to the RF reception signal from the reception paths 56 and 57 of these same modules;
- an input 518 dedicated to the control of a controllable phase-shifter circuit 512, configured to apply, in the transmission path 55 of the second transmission/reception module, a given phase-shift $\theta$ to the signal delivered by the wave form generator 531; and to the control of a controllable phase-shifter circuit 513, configured to apply this same phase-shift $\theta$ to the RF reception signals from the reception path 57 of this same module;
- an input 519 dedicated to the control of the switching circuits 515 and 516 which make it possible to alternately set the inputs/outputs 521-524 of the switches 515 and 516 of the electronic circuit 51 to input or output mode.

From a functional point of view, the implementation of the controllable phase-shifters 59 and 511 makes it possible to apply a same phase-shift $\varphi$ to the signals delivered to the radiating element 52 by the two transmission/reception modules and to the RF reception signals corresponding to the radiofrequency signals picked up by the radiating element 52. This functionality advantageously makes it possible to produce a multi-source antenna by associating the radiating elements 52 of a plurality of devices in an array, as is represented in FIG. 5, each device being assigned a phase-shift $\varphi$ that is a function of the direction in which the antenna points.

In such a structure, each device receives the signal produced by a same signal generator and applies to said signal a phase-shift $\varphi$ that is a function of the position of the device in the array before transmitting it, in differential form, to the radiating element 52.

Conversely, each device receives the signals delivered in differential form by the radiating element 52 and transforms it into a non-differential RF signal and applies to the latter a phase-shift $\varphi$ that is a function of the position of the device in the array before transmitting it to the receiver.

Moreover, the implementation of the controllable phase-shifters 512 and 513 advantageously makes it possible to apply a complementary phase-shift $\theta$ to the transmission 55 and reception 56 paths of the second transmission/reception module, such that the signals delivered by the electronic circuit 51 on the power supply lines 525 and 526 of the radiating element 52, just as the RF reception signals corresponding to the radiofrequency signals delivered by the radiating element 52 have between them a phase-shift of given value $\theta$.

As is detailed in the abovementioned French application, the implementation of the controllable phase-shifters 512 and 513 thus advantageously makes it possible to radiate two radiofrequency signals, the recombination in space of which produces a signal having a polarization whose nature is a function of the value of the complementary phase-shift $\theta$ applied to the RF transmission signal delivered by the second transmission reception module.

Conversely, this implementation makes it possible, in reception, to recognize only the RF reception signals corresponding to the radiofrequency signals received that have a given polarity determined by the phase-shift $\theta$.

As stated previously, the phase-shift commands applied to the different phase-shifters are in principle delivered to the transmission/reception device by a control module 533 that is integrated functionally, or physically, in the transmission/reception management system of the radar equipment in which the device is incorporated. These commands are transmitted to the phase-shifters via a control bus, the value of the phase-shift command being kept constant between two changes of value.

Now, regarding notably the phase-shifters 512 and 513 which ensure the relative phase-shift $\theta$ between the transmission paths 54 and 55 and between the reception paths 56 and 57, the time lapse between two changes of the charging value may prove short and the rate of these changes may prove high, such that the control bus which conveys these values may exhibit a sustained electrical activity during the phases of reception of the radiofrequency signals backscattered by the environment, and provoke the appearance of interference signals on the reception paths. This may also be the case for the phase-shifters 59 and 511.

Consequently, the theoretical structure presented in FIG. 5, in which the commands of the phase-shifters, the phase-shifters 512 and 513 in particular, are delivered directly by the control module 533, appears better suited to systems in which the rate of the changes of phase-shift command value remains low and/or in which these changes can take place outside of the phases of reception of the backscattered echoes.

In the context of the method according to the invention, the value of the phase-shift $\theta$ is made to vary, at the minimum, in pace with the alternation of the short and long range processing operations. Consequently, the value of the phase-shift command $\theta$ applied to the phase-shifters 512 and 513 is likely to change frequently, this variation provoking frequent exchanges of data over the control bus by which the control module 533 controls each of the phase-shifters 512 and 513.

This is why, in the context of the invention, a functional adaptation of the theoretical structure of the device described in the abovementioned French application and illustrated by FIG. 5 is envisaged.

This functional adaptation, illustrated by FIGS. 6 and 7, consists in controlling the phase-shifters 512 and 513 via a control module 62 mainly comprising a memory 621 and an address generator 622. A transmission-reception device 61 is thus obtained that is capable of directly managing the phase change sequences required by the desired mode of operation (bi-pulse mode), without digital data transiting between the control module 533 and the device 61 during the phases of operation in reception mode thereof.

According to the invention, the address generator 622 is configured to perform, periodically, a circular addressing of the memory 621, each memory location 623 being addressed in succession. Advantageously, the address generator 612 used can be programmed according to the mode of operation concerned, to perform a cyclical read of the memory locations in a constant order, in ascending or descending order of addresses or in a variable order, alternatively in ascending then descending order of addresses.

From a functional point of view, the memory 621 can be of different types. It can consist of a preprogrammed memory containing different phase-shift command values intended to be transmitted in sequence to the phase-shifters 512 and 513.

Alternatively, it can consist of a reprogrammable memory whose content is for example loaded by the controller 533. The memory 621 is then provided with an R/W command input 63 allowing the controller 533 write mode access thereto.

Also, the data is arranged in the memory 621 in such a way that it is possible, by applying a circular addressing, to reproduce a given sequence of phase-shift command values which induces a periodic variation of the phase-shift θ applied to the transmission 55 and reception 57 paths.

Also from a functional point of view, the size of the memory 621 is determined as a function of the number of distinct values that the phase-shift commands can take, and of the time for which a given command must be maintained.

Thus, if, as FIG. 7 illustrates, the address generator 622 is paced by a constant clock H, a given phase command will be able to be written in several successive memory locations, the number of locations being a function of the ratio of the time for which the command must be applied to the duration of the period H, the period of the clock H being defined appropriately.

The provision of a memory 621 and of a loop-mode addressing (circular addressing), thus makes it possible to produce changes of the value of the phase command applied to the phase-shifters 512 and 513, according to a rate that is both variable and rapid, without, during operation, having to have fluctuating digital data circulate in the vicinity of the reception paths 56 and 57 of the device. The generation of interferences likely to affect the reception of the signals is thus advantageously avoided.

In the operating configuration illustrated by the timing diagrams of FIGS. 3 and 4, the memory 621 will for example be able to be programmed to vary the phase command θ applied to the phase-shifters 512 and 513, at the rate of alternation of the successive transmissions of the short pulses 21 and of the long pulses 22.

Likewise, in the operating configuration illustrated by the timing diagram of FIG. 8, the memory 621 will for example be able to be programmed to vary the phase command θ applied to the phase-shifters 512 and 513, at the rate of the successive transmissions of the short pulses 21 and of the long pulses 22 and, for a long pulse 22, at the rate of the phase variation applied to the RF transmission signals that make up the long pulse; the RF transmission signals that make up the long pulse being for example assigned a relative phase-shift θ that takes, in alternation, a value chosen from a set of values, so as to constitute a radiofrequency signal whose polarization varies during the time of transmission of the long pulse.

FIG. 9 schematically presents an alternative embodiment, a variant embodiment of the transmission-reception device 61, illustrated by FIGS. 6 and 7.

According to this variant, more particularly suited to a transmission-reception device associated with a digital radar receiver 93, the two reception paths 56 and 57 of the device according to the invention are not recombined and the RF reception signals 96 and 97 from the radiofrequency signals picked up by the radiating element 52 are transmitted by two distinct channels 94 and 95 to the receiver 93, the latter being configured to perform a separate processing of the two paths.

In this variant implementation, the phase-shift command φ is applied to the two paths separately by means of two phase-shifters 91 and 92. The application of a phase-shift between the two reception paths is, in this case, shifted to the receiver 93 and processed digitally.

This variant implementation advantageously makes it possible to digitally apply, between the signals corresponding to each of the reception paths 56 and 57, a phase-shift θ' that can take different values, that are functions of the direction of polarization according to which the received signals are desired to be analysed; θ' being able to be identical to θ or different therefrom.

It is thus possible, in each transmission-reception module 61, to analyse the backscattered signal picked up by the radiating element 52 simultaneously according to different polarization directions, by acting at the reception level on the relative phase applied to the received signals and on the relative amplitude thereof.

This variant implementation also makes it possible, advantageously, in the context of a multi-source antenna consisting of a plurality of transmission-reception devices 61 forming an array of radiating sources, to analyse the signal received by the overall multi-source antenna simultaneously in different polarization directions. To do this, it is sufficient to perform separate summings of all the first reception paths of the difference devices on the one hand and of all the second reception paths of the different devices on the other hand, and to apply to the resulting signals a phase-wise processing identical to that described previously.

This variant implementation also advantageously makes it possible to vary the polarization of the pulse by pitch intervals or linearly to search for the polarization that is most favourable to the detection of cables in airborne systems, notably helicopters; the scanning of all the polarizations making it possible to find the optimum polarization for the cable, it being understood that all the polarizations are digitally calculated in reception. Thus, inasmuch as the reflection of the signals on the cables depends on the geometry of the cables (section and direction of the bundle), the possibility of being able to use all the polarizations by scanning in transmission will make it possible to benefit from a detection capability that is improved compared to that offered by the known solutions than can be envisaged in the case in point, solutions which allow only changes of polarization by switching, at best from pulse to pulse.

This method also makes it possible to benefit from the two polarizations simultaneously, which is particularly useful when seeking to perform a "Spot SAR" for which it is necessary to have all the power of the radar to focus the signal, such that it is not possible to split the antenna into two, one part for the reception in H, another for the reception in V. The proposed method makes it possible to have the two polarizations simultaneously in reception without any gain reduction or widening of the beam of the antenna.

The search by scanning for the optimal polarizations for a given application, in other words polarizations that make it possible to benefit from a detection capability that is improved compared to that offered by the known solutions that can be envisaged in the case in point, can notably be performed by using a heuristic type process of determination.

Such a process consists, initially, in transmitting pulses assigned determined polarities randomly then, in a second stage, in performing an assessment of the quality of the reception for the current choice of polarizations. This choice is assessed as a function of the distance and of type of target, by measuring the rate of false alarms and the detection probability. If the criteria retained are not optimally satisfactory, a new draw is made giving birth to new polarization values. The polarizations that give the best results can then be, moreover, stored to be able to be reused according to the context concerned.

Thus, a set of polarizations deemed optimal for a given distance, type of target and type of clutter, will advantageously be able to be stored in a database. A stored set of polarizations will then be able to applied as such in similar circumstances or be used as starting basis for a refining process implementing piecewise and random changes of polarization that make it possible to optimise the reception quality obtained in real time, the refining of the stored data making it possible to enrich and enhance the database.

The duly made choice of polarization also makes it possible improve the contrast between the targets and the clutter.

The invention claimed is:

1. A radar transmission and reception method, the radar transmission and reception method comprising:
   implementing a short range mode of operation with transmission of short pulses and a long range mode of operation with transmission of modulated long pulses, the short and long pulses transmitted being temporally interleaved,
   wherein the short pulses and the long pulses are transmitted in the form of waves having distinct polarizations, the polarization of the waves transmitting short-pulses being thus distinct from the polarization of the waves transmitting long pulses, and the polarization of each transmitted wave being obtained by simultaneously transmitting, by two co-located radiating sources, for each pulse, two signals having a phase-shift $\theta$ whose value varies according to a short or long nature of a pulse concerned.

2. The method according to claim 1, wherein for the short pulses, the two signals transmitted have a phase-shift $\theta$ whose value induces a vertical polarization of the transmitted wave and in that, for the long pulses, the two signals transmitted have a phase-shift whose value induces a horizontal polarization of the transmitted wave.

3. The method according to either claim 1, wherein backscattered radiofrequency signals following the transmission of a pulse being picked up by each of the radiating sources, a phase-shift $\theta'$ of given value is applied to the radiofrequency signal received by that same source.

4. The method according to claim 3, wherein the phase-shift $\theta'$ is equal to the phase-shift $\theta$.

5. A radar transmission and reception device, capable of implementing the method according to claim 1, wherein the radar transmission and reception device is configured to perform the following operations:
   producing two synchronous radiofrequency (RF) transmission signals, said signals having between them a phase-shift $\theta$ of controllable given value, said signals having amplitudes being also controllable;
   radiating two radiofrequency waves, each corresponding to one of the transmission RF signals produced, by means of two radiating sources each having a given polarization axis;
   handling a reception of backscattered radiofrequency signals picked up by each of the radiating sources; and
   delivering two radiofrequency (RF) reception signals, each signal corresponding to the backscattered radiofrequency signal picked up by one of the radiating sources, to which is applied a given phase-shift $\theta'$.

6. The device according to claim 5, wherein the device comprises a radiating element and an electronic circuit incorporating a first transmission/reception module, consisting of a first transmission path and a first reception path and a second transmission/reception module, consisting of a second transmission path and a second reception path, the two transmission/reception modules having an identical structure; each transmission/reception module comprising a switch, making it possible to alternately connect the transmission path and the reception path of the module concerned to the radiating element.

7. The device according to claim 6, wherein the radiating element is formed by a patch antenna, substantially planar, having a regular form, comprising four connection points disposed pairwise symmetrically relative to the center of the patch, on two right-angled axes, two symmetrical connection points forming a connection port of the antenna.

8. The device according to claim 7, wherein the radiating element is a patch antenna of square form.

9. The device according to claim 7, wherein the first and second transmission/reception modules are each connected to the radiating element by a pair of power supply lines, the connection points disposed symmetrically on the antenna patch are linked to inputs/outputs of a same transmission/reception module via a switch.

10. The device according to claim 6, wherein inputs of the first and second transmission paths of the two transmission/reception modules are configured to be driven by a same RF signal delivered by a wave form generator linked to the electronic circuit by an input, the transmission path of the second transmission/reception module comprising at the input a controllable phase-shifter circuit, making it possible to introduce a given phase-shift $\theta$ between the two transmission paths.

11. The device according to claim 6, wherein the outputs of the first and second reception paths of the transmission/reception modules are summed by means of an adder circuit then linked to a same receiver by a common output of the electronic circuit, the reception path of the second transmission/reception module comprising at its output a controllable phase-shifter circuit making it possible to introduce, between the two reception paths, a given phase-shift $\theta$ equal to the phase-shift introduced between the two transmission paths.

12. The device according to claim 6, wherein the electronic circuit comprises a control module configured to independently generate the commands for phase-shifters responsible for the phase-shift $\theta$, said control module mainly comprising a memory and an address generator configured to apply a circular addressing of locations of the memory.

13. The device according to claim 11, wherein the electronic circuit comprises controllable phase-shifters configured to apply a same phase-shift $\varphi$ to a RF signal delivered by a wave form generator and to the signals delivered by the two reception paths.

14. The device according to claim 6, wherein the outputs of the first and second reception paths of the transmission/reception modules are linked, by two outputs of the electronic circuit, to two distinct reception paths of a same digital receiver configured to apply a phase-shift $\theta'$ between the signals from the two reception paths.

15. The device according to claim 14, wherein each of the reception paths comprises a controllable phase-shifter, each of the phase-shifters being configured to apply, to a corresponding reception path, a same phase-shift φ equal to the phase-shift applied to a RF signal delivered by a wave form generator.

16. A radar surveillance system comprising a wave form generator, an array of patch antennas and a receiver, wherein it comprises a set of transmission-reception devices according to claim 6, the wave form generator and the receiver being linked to each of the patch antennas of the array via a transmission/reception device.

* * * * *